Jan. 24, 1956    J. P. FRANCIS    2,731,944
HOUSING FOR REMOVABLE ATTACHMENT TO A SHAFT
Filed June 30, 1952
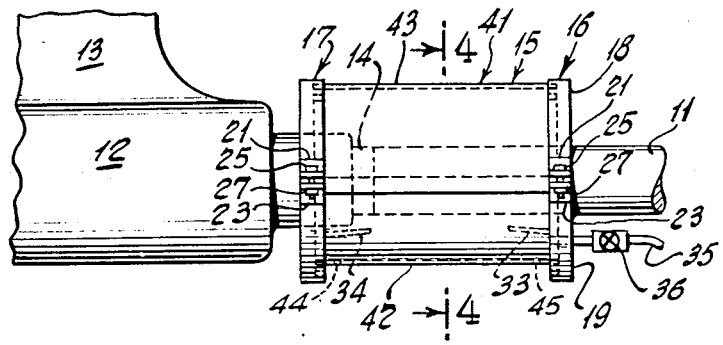
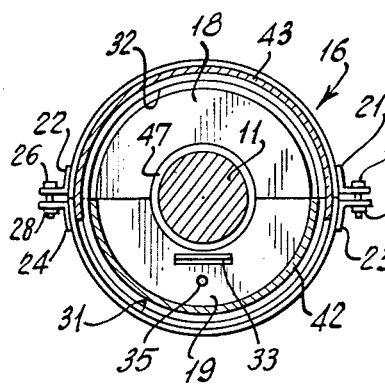
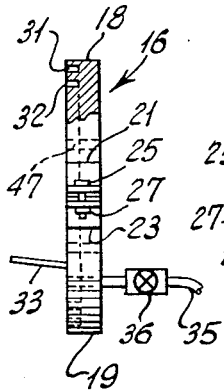
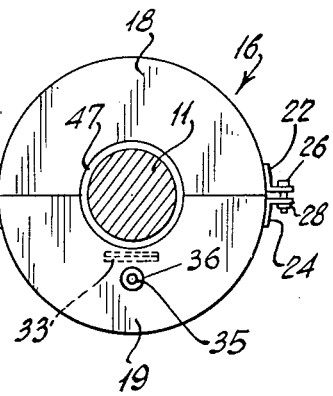
INVENTOR.
JOHN P. FRANCIS
BY George Sipkin
Lee J. Huntzberger
Attorneys

United States Patent Office 2,731,944
Patented Jan. 24, 1956

2,731,944
HOUSING FOR REMOVABLE ATTACHMENT TO A SHAFT

John P. Francis, Haverhill, Mass.

Application June 30, 1952, Serial No. 296,533

2 Claims. (Cl. 118—58)

(Granted under Title 35, U. S. Code (1952), sec. 266)

The invention described herein may be manufactured and used by or for the Government of the United States of America for governmental purposes without the payment of any royalties thereon or therefor.

The present invention concerns a housing and in particular concerns a housing that can be removably attached to a shaft for protecting the shaft while work is being thereon performed.

In repairing the propulsion shaft of a water-borne vessel while in drydock, it is necessary to apply neoprene to certain portions of such shaft. During the application of neoprene it is necessary at different stages of the application to maintain the heat of the neoprene at different regulated temperatures and to prevent moisture, sand, metal particles and other foreign objects from access to the neoprene. Before the present invention it has been conventional in applying neoprene to propulsion shafts to provide a housing at the area of the shaft to be treated in the form of a porous canvas-covered tenting together with a large cumbersome heater to maintain heat within the shelter at desired temperature. It has been conventional practice to support the tenting upon a stage or platform rigged beneath the shaft.

The present invention overcomes the disadvantages of the conventional practice by providing a housing of simple construction that can be removably attached to the shaft without the necessity for a supporting stage or platform, thus providing a clear and safe work area adjacent the shaft. The housing is provided with steam inlets and suitable baffle plates, thus eliminating the necessity for cumbersome heaters. The housing is fireproof, economical to manufacture, economical to install and operate, easily assembled and disassembled, and is efficient in operation.

An object of the invention is to provide a housing.

Another object is to provide a housing that can be removably attached to a shaft.

Another object is to provide a housing in the form of a split shell that can be closed upon a shaft or opened to disassemble the housing from the shaft.

Another object is to provide a housing of this type in which there is no need for a supporting stage or platform and in which the temperature can be regulated and moisture, sand, metal particles and other foreign objects are excluded.

Other objects and many of the attendant advantages of this invention will be readily appreciated as the same become better understood by reference to the following detailed description when considered in connection with the accompanying drawings wherein:

Fig. 1 is a front elevation of a preferred form of housing mounted on the propulsion shaft of a vessel in drydock, Fig. 2 is an end elevation from the right of Fig. 1, Fig. 3 is a rear elevation of the split-ring forming one component of the housing as seen from the right of Fig. 2, and Fig. 4 is a sectional view taken substantially along line 4—4 of Fig. 1.

In the drawing there is shown a propulsion shaft 11 extending from the bearing 12 supported by strut 13 of a vessel in drydock. An area 14 of shaft 11 is shown that is to be neoprened.

Mounted upon the exposed portion of shaft 11 is housing 15 comprising a pair of split-ring assemblies 16 and 17 that are in axial alignment and axially-spaced relation. Each split-ring assembly 16, 17 includes an upper ring half 18 and a lower ring half 19. Upper ring half 18 and lower ring half 19 are similar in construction and arranged in mirror-image relation when assembled.

Each upper ring half 18 is provided with clamp brackets 21 and 22. Each lower ring half 19 is provided with corresponding clamp brackets 23 and 24. Bolts 25 and 26 with respective nuts 27 and 28 are provided for locking the clamp brackets in assembled position. Split-ring assemblies 16 and 17 on the surfaces facing each other each has an outer circular groove 31 and a concentric inner circular groove 32. The outer grooves 31 are of common radius and axially aligned and the inner grooves 32 are of a common radius and axially aligned. In each split-ring assembly 16, 17 both grooves 31 and 32 are continuous between the upper ring halves 18 and the lower ring halves 19.

Bottom ring halves 19 of split-ring assemblies 16, 17 are provided with a pair of baffle plates 33 and 34 extending toward each other from the surfaces of lower ring halves 19 that face each other. Connected to lower half 19 of split-ring assembly 16 is an inlet pipe 35 controlled by a valve 36. Inlet pipe 35 is located directly beneath baffle plate 33.

Disposed between split-ring assemblies 16, 17 is a cover assembly 41 that includes a lower shell 42 forming substantially a half cylinder of the same radius as groove 32. The opposite ends of shell 42 are rotatably seated in grooves 32 of split-ring assemblies 16, 17. Cover assembly 41 also includes an upper shell 43 forming a part cylinder of slightly more than 180° arc and of the same radius as groove 31. The opposite ends of shell 43 are rotatably seated in grooves 31 of split-ring assemblies 16, 17. Moisture escape openings 44 and 45 are provided in the bottom of lower cover 42.

Either of split-ring assemblies 16, 17 can be adapted to fit a shaft of smaller diameter than that of the central opening in the split-ring assemblies 16, 17. As shown in Fig. 4, for example, the central opening of split-ring assembly 16 is lined with a collar 47 of rubber or the like that is adapted to seat upon shaft 11 which is of smaller diameter than the central opening of split-ring assembly 16.

In operation housing 15 is assembled in shaft 11 from disassembled condition as follows. In disassembled condition split-ring assemblies 16, 17 are disassembled from shaft 11 and also are disassembled with respect to lower cover 42 and upper cover 43. In order to assemble, split-ring assemblies 16, 17 are mounted on shaft 11 on opposite sides of the shaft area 14 that is to be neoprened. Each split-ring assembly 16, 17 is assembled by bringing the upper ring half 18 and lower ring half 19 together from opposite sides of shaft 11. Bolts 25, 26 and nuts 27, 28 are then assembled loosely so that split-ring assemblies 16, 17 are maintained in assembled relation but are loose enough on shaft 11 so that they can be manipulated to assemble lower cover 42 and upper cover 43.

Lower cover 42 is then disposed with its ends in groove 32 and upper cover 43 is disposed with its ends in groove 31. The spacing apart axially of split-ring assemblies 16 and 17 is such that lower cover 42 and upper cover 43 can be readily rotated by hand. Bolts 25, 26 and nuts 27, 28 are then tightened to lock the housing 15 in assembled relation.

In applying neoprene to a shaft the painter first rotates upper cover 43 into open position so that he can have access to the upper portion of shaft 11. He then closes upper cover 43 and opens lower cover 42 so that he can have access to paint the lower portion of shaft 11. Covers 42 and 43 can be rotated with respect to each other and to any desired angular position so that the painter can have access to any angular portion of the shaft that is desired.

During curing of the neoprene that is painted on shaft 11 lower cover 42 and upper cover 43 are moved into closed and overlapping position as shown in Fig. 4. Valve 36 is then opened to permit steam to enter through inlet 35 to the interior of housing 15. The steam within housing 15 is prevented by baffle plates 33 and 34 from rising into contact with the neoprene painted on shaft 11. The heat within housing 15 can be regulated to various desired temperatures during curing by means of valve 36. With covers 42 and 43 in closed position as shown in Fig. 4, shaft 11 is completely shielded from moisture, sand, metal particles and other foreign objects.

Obviously many modifications and variations of the present invention are possible in the light of the above teachings. It is therefore to be understood that within the scope of the appended claims the invention may be practiced otherwise than as specifically described.

I claim:

1. A housing for removable attachment to a shaft, said housing comprising a pair of split-ring assemblies in axial alignment and in axially-spaced relation, each split-ring assembly including a first ring half and a similar second ring half assembled in mirror-image relation to said first ring half, means for detachably fastening said first and second ring halves in assembled relation, a pair of baffle plates extending toward each other from the surfaces of the bottom ring halves facing each other, inlet means in one of said split-ring assemblies; a cover assembly including a first shell forming substantially a half cylinder, a second shell forming a cylinder of slightly more than 180° arc, said shells being of different radii, said shells being coaxially and rotatably mounted on said split-ring assemblies, said shells being independently mounted on said split-ring assemblies, said covers being arrangeable in closed position with the covers in overlapping complementary relationship to form a tubular enclosure, said covers being rotatable relative to each other into open position with said covers along one side being withdrawn from each other to provide access from the outside to the inside of said cover assembly.

2. A housing for removable attachment to a shaft, said housing comprising a pair of split-ring assemblies in axial alignment and in axially-spaced relation, each split-ring assembly including a first ring half and a similar second ring half assembled in mirror-image relation to said first ring half; means for detachably fastening said first and second ring halves in assembled relation, one of said pair of split ring assemblies being formed with an inlet opening; a cover assembly including a first shell forming a longitudinal section of a cylinder of substantially 180° arc, a second shell forming a longitudinal section of a cylinder of slightly more than 180° arc, said shells being of different radii, said shells being coaxially, rotatably, and independently mounted on said split-ring assemblies and being arrangeable in overlapping complementary relationship to form a tubular enclosure, said shells being rotatable relative to each other to provide access from the outside to the inside of said housing.

References Cited in the file of this patent

UNITED STATES PATENTS

| | | |
|---|---|---|
| 727,010 | Smith | May 5, 1903 |
| 1,765,628 | Staley | June 24, 1930 |
| 1,851,538 | Day et al. | Mar. 29, 1932 |
| 2,100,639 | Doolittle et al. | Nov. 30, 1937 |
| 2,123,304 | Hetzer | July 12, 1938 |
| 2,336,533 | Dilworth | Dec. 14, 1943 |
| 2,340,325 | Horrigan | Feb. 1, 1944 |
| 2,359,977 | Duggan | Oct. 10, 1944 |
| 2,426,493 | Eriksson et al. | Aug. 26, 1947 |
| 2,545,792 | Perrault | Mar. 20, 1951 |
| 2,574,706 | Perrault | Nov. 13, 1951 |